United States Patent [19]

Ciaccio et al.

[11] 4,161,077

[45] Jul. 17, 1979

[54] RADIO CONTROLLED FISHING APPARATUS

[75] Inventors: Charles J. Ciaccio, 4060 Byron Ave., Titusville, Fla. 32780; Harry A. Rinehart, Titusville, Fla.

[73] Assignee: Charles J. Ciaccio, Titusville, Fla.

[21] Appl. No.: 903,732

[22] Filed: May 8, 1978

[51] Int. Cl.$^2$ .................. A01K 97/00; A63H 23/02
[52] U.S. Cl. ................................. 43/26.1; 46/250
[58] Field of Search ............ 43/26.1, 26.2, 4, 4.5; 46/250, 93; 114/144 R

[56] References Cited

U.S. PATENT DOCUMENTS

| | | | |
|---|---|---|---|
| 2,693,047 | 11/1954 | Lumsden | 43/26.1 |
| 2,742,735 | 4/1956 | Sommerhoff | 46/250 X |
| 2,803,914 | 8/1957 | Ellis | 43/26.1 |
| 3,710,500 | 1/1973 | Pena | 43/26.1 X |
| 3,793,761 | 2/1974 | Bonham | 43/26.1 |

OTHER PUBLICATIONS

*American Modeler*, "Starting R/C Model Boating", vol. 52, No. 6, Sep. 1956, pp. 26, 27, 60.

*Primary Examiner*—Nicholas P. Godici
*Attorney, Agent, or Firm*—Richard D. Dixon

[57] ABSTRACT

The present invention relates to a combination fishing apparatus and toy vessel for controllably towing a section of fishing line intermediate a baited end and the angler. The apparatus includes a floating body and a receiver having an antenna coupled thereto. The receiver is adapted for receiving radio control signals from a distant command transmitter. The radio receiver includes a first demodulator for reconstructing a first signal from the radio control signals. A propulsion system is operably coupled to the radio receiver for propelling the floating body either in the forward or reverse direction over the surface of the body of water responsive to the first signal. A line release device is coupled to the antenna adjacent a distended end thereof for receiving therethrough and controllably releasing an intermediate section of the fishing line responsive to the tension on the fishing line exceeding a predetermined limit. In a first preferred embodiment of the present invention control signals from the radio receiver are also utilized to control a rudder which determines the direction of motion of the vessel over the body of water. The control signals from the radio receiver are also utilized to determine the speed of the vessel. The control signals are further utilized for actuating a location signal in order to aid the angler in locating the vessel.

10 Claims, 3 Drawing Figures

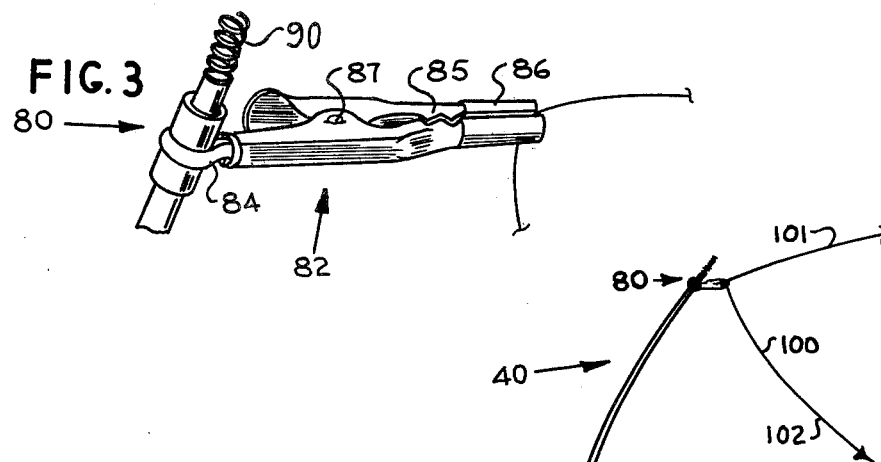
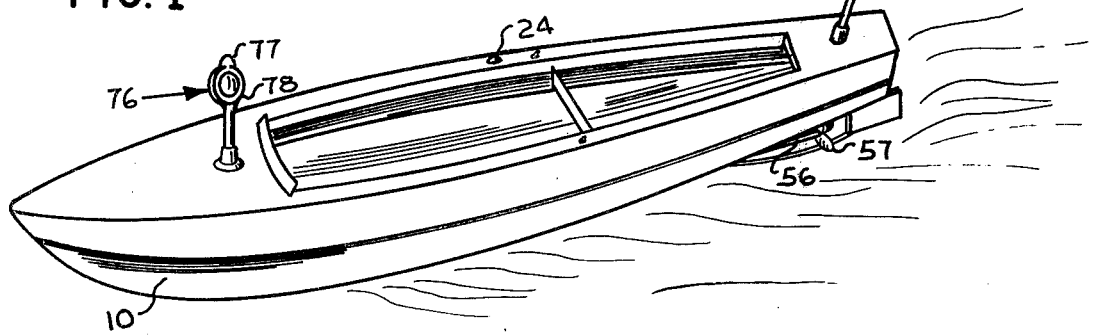
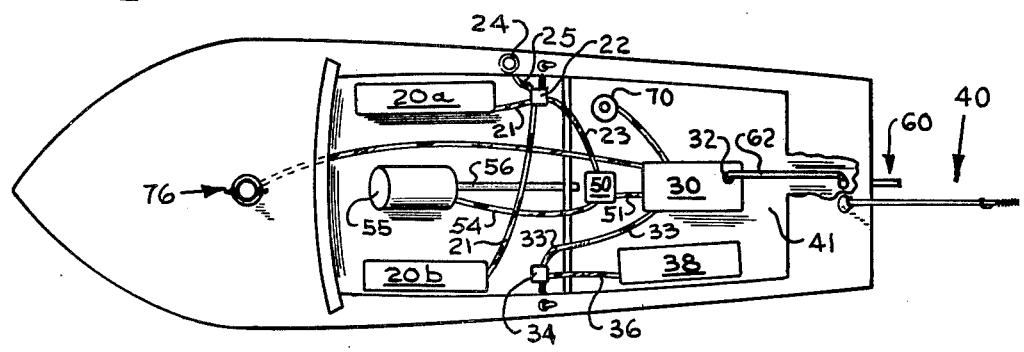

RADIO CONTROLLED FISHING APPARATUS

BACKGROUND OF THE INVENTION

I. Field of the Invention

The present invention relates generally to fishing devices and more particularly to radio controlled vessels designed to tow, in accordance with radio control signals, a section of fishing line spaced between the angler and the baited end thereof.

II. Description of the Prior Art

Fishermen have long recognized the need for an independently controlled vessel which can be coupled to an intermediate section of a fishing line for trolling the fishing line and the bait into shallow waters and other locations where either a land-based or marine-based angler cannot penetrate. For example, a shallow draft vessel may be very helpful for allowing the angler to troll the baited hook through a section of shallow water infested with weeds or other aquatic vegetation. The use of an ordinary boat would necessitate a fairly deep draft which is not always available. Furthermore, the presence of extensive aquatic vegetation of the type which attracts fish may foul and incapacitate the normal operation of the propulsion system for the boat.

Likewise, a land-based angler may also utilize a remotely controlled fishing vessel for trolling or towing the baited fishing hook into sections of a body of water far beyond the distances which the angler could normally cast the baited hook. Also, the use of two or more of these specially designed fishing vessels may allow a single angler to fish in two different areas simultaneously. It is well known to the avid fisherman that fish feed at predictably critical times of the day, and the ability to have at least two or more baited hooks moving through areas of water known to be frequented by fish during the critical fishing periods will often enable the fisherman to greatly increase the day's catch.

The prior art includes several fishing devices which employ remotely controlled direction and speed functions. For example, the disclosure of Jackson in U.S. Pat. No. 2,804,712, includes a buoyant body which is towed along the surface of the body of water by a fishing line having an intermediate section thereof which communicates through eyes attached to the ends of the floating body. Bonham, in U.S. Pat. No. 3,793,761, discloses an electrically driven miniature fishing vessel designed to receive and hold therein a fishing pole. The direction of travel of the fishing vessel is controlled by a rudder which is mechanically coupled to a tether line by which the angler can incrementally adjust the position of the rudder. Lumsden, in U.S. Pat. No. 2,693,047, discloses a remotely controlled fishing vessel employing a tension-clip spring adapted to engage and hold an intermediate section of the fishing line. An electrical switch is provided such that when the fishing line disengages from the tension clip spring, the electrical power supplied to the motors propelling the fishing vessel will be disengaged. The direction of travel of the fishing vessel is controlled by two separate tethered lines which are tensioned by the operator. Cahen, in U.S. Pat. No. 3,099,099, discloses an electrically powered fishing vessel which employs a single vertical pole for movably engaging with an intermediate section of the fishing line. Merl, in U.S. Pat. No. 2,894,473, discloses a radio controlled aquatic vessel, and more particularly describes a means for controlling the vessel with radio signals.

Other radio controlled aquatic vessels have been disclosed by Sommerhoff in U.S. Pat. No. 2,742,735, and Hornbostel in U.S. Pat. No. 3,280,501. Anderson, in U.S. Pat. No. 3,613,284, discloses a radio controlled submarine which is adapted to couple with an intermediate section of fishing line, thereby trolling the baited end of the fishing line through a body of water. Reid, in U.S. Pat. No. 2,903,822, discloses a radio control system for controlling the inflation or deflation of a ballast bag within a submarine vehicle.

Pena, in U.S. Pat. No. 3,710,500, discloses an aquatic vehicle which employs a timer for releasing the sinkers coupled to a fishing line after a predetermined period of time has elapsed following the launch of the aquatic vessel. Uus, in U.S. Pat. No. 2,726,471, discloses a motorized fish bait and hook carrier which includes a hollow body having a propulsion means thereon. This device proceeds from the launching point and, at a predetermined distance, launches the baited hooks. Thomas in U.S. Pat. No. 2,382,677 discloses a leader control for a fishing line.

While each of these references basically solves the limited problem for which they were designed, none of these references discloses a technically sophisticated aquatic vehicle suitable for coupling and trolling with an intermediate section of fishing line. In contrast with the prior art, the present invention employs a technically sophisticated radio controlled system for propelling and guiding the aquatic vehicle as it trolls at a distance from the main control station.

A first object of the present invention is to adapt the aquatic vehicle for being controlled by radio signals. An antenna for receiving these radio control signals is also adapted for receiving and removeably coupling with the intermediate section of the fishing line to be trolled.

Another object of the present invention is to provide a location system which will enable the angler to utilize either visual or audible sensors to locate the fishing vessel at night or when the aquatic vehicle is located in weeds which obscure direct vision.

A still further object of the present invention is to incorporate the use of a device for holding and restraining the intermediate section of fishing line during normal operation, and then triggering a signaling device when the line is extracted from the normally restrained position.

SUMMARY OF THE INVENTION

This invention relates to a combination fishing apparatus and toy vessel for controllably towing a section of fishing line intermediate a baited end and the angler. The apparatus includes a floating body which is designed to travel over the surface of a body of water. Radio receiver means are provided having an antenna coupled thereto for receiving radio control signals from a distant command transmitter. The radio receiver means includes first demodulator means for reconstructing a first signal from the radio control signals. Power means are operably coupled to the radio receiver means for propelling the floating body over the surface of the body of water responsive to the first signal. Line release means are coupled to the antenna adjacent a distended end thereof for receiving therethrough and controllably releasing an intermediate section of the fishing line responsive to the tension on the fishing line exceeding a predetermined limit.

Location means are provided for emitting location signals responsive to a third signal decoded by the demodulator means from the radio control signals. In a first preferred embodiment of the present invention, the line release means includes a pair of juxtaposed moveable jaws which are biased to receive and hold therebetween the intermediate section of the fishing line. The line release means are moveably coupled to the distended end of the antenna for swiveling around a rotational axis generally defined by the longitudinal axis of the antenna.

BRIEF DESCRIPTION OF THE DRAWINGS

Other objects, features and advantages of the present Invention will be apparent through a study of the written description and the drawings in which:

FIG. 1 illustrates a frontal perspective view of a radio controlled aquatic vehicle in accordance with the teachings of the present invention.

FIG. 2 illustrates a top view of the radio controlled fishing apparatus in accordance with the present invention.

FIG. 3 illustrates a perspective view of the line release means coupled to the distended end of the radio antenna.

DETAILED DESCRIPTION OF THE PREFERRED EMBODIMENT

A first preferred embodiment of the radio controlled fishing apparatus in accordance with the present invention is illustrated generally in FIGS. 1 and 2. The apparatus includes a hydrodynamically shaped hull 10, or floating body, which is buoyantly supported adjacent the surface of a body of water. The hull 10 may have any of a multitude of shapes depending upon the specific design parameters and the aesthetic requirements of the owner or developer. Typically the hull 10 will be manufactured of a fiberglass or aluminum material having high strength and high resistance to fatigue. The outside surface of the hull 10 will define therein a void into which the propulsion system and control systems for the device will be located.

As illustrated in FIG. 2, a pair of rechargeable nickel-cadmium batteries 20a and 20b are physically mounted adjacent the upstanding sides of the hull 10 at a point generally midway between the bow and stern sections of the boat. The batteries 20 are coupled by electrical conductors 21 to a main propulsion switch 22 which is located adjacent the starboard side of the hull 10. Additional circuit lines 23 couple the main propulsion switch 22 with a speed control system 50.

The radio receiver system utilized in the present invention typically comprises a digital proportional system operating in the range of 30 Megahertz. The radio receiver 30 is tuned to a specified frequency channel within the spectrum set aside for radio control purposes. This frequency channel is coordinated to correspond precisely to the transmit frequency of a remotely located and corresponding radio control transmitter, such as a Kraft Model KP5C. Typically the radio control system utilizes an amplitude modulation system for relaying the radio control signals. These radio control signals are received by a radio antenna, shown generally as 40 in FIGS. 1 and 2.

This radio receiving antenna 40 is mounted adjacent the stern of the hull 10 and is the tallest element mounted thereon. An electrical conductor communicates upwardly through the flexible mast comprising the antenna 40. This antenna 40 may be electrically shortened by the use of loading coils or in the alternative the antenna may be formed from winding a length of wire circumferentially around a flexible mast until the proper electrical length and resonance are achieved. The opposite end of the electrical conductor 41 is coupled to the radio receiver 30. In a manner well known within the art the radio receiver system 30 receives the radio control signals and demodulates these signals which are thereby formed are then coupled to various elements of the control system for performing various tasks to be subsequently described.

For example, the radio receiver 30 includes a first output which provides a first signal representing the desired rpm of an electrical motor 55 which propels the hull 10 through the water. This first signal is coupled to the electric motor proportional speed control system 50 by the circuit conductor 51. In a first preferred embodiment of the present invention this electric motor proportional speed control system 50 comprises a Futaba FP-MCIIB electronic device which regulates both the speed and the direction of an electromechanical device coupled thereto. Such control systems typically utilize either pulse-width modulation or pulse amplitude modulation for controlling the amount of electrical energy which is supplied from the batteries 20, through the circuit lines 21 and 23, and through the circuit conductors 54 to the electrical motor 55. Therefore, the first signal derived from the demodulator section of the radio receiver 30 controls the direction and the rate of flow of electrical energy from the batteries 20 to the electric motor 55. Since the speed of the electric motor 55 is determined by the amount of power coupled thereto, the first signal controls the speed of this motor. The first preferred embodiment utilizes a motor 55 manufactured by Mabuchi, Model 65(RS54K) which has a maximum speed of 9,000 rpm and draws approximately 500 milliamperes. The rotation of the electric motor 55 rotates a drive shaft 56 which communicates through the bottom of the hull 10. A propeller 57 is coupled adjacent a distended end of the shaft 56 for being rotated by the shaft, thereby propelling the hull 10 through the body of water.

Electrical energy is supplied to the radio receiver 30 from a special rechargeable nickel-cadmium battery 30 through electrical conductors 36, an electrical switch 34 and an electrical conductor 33. The radio receiver 30 may be actuated by engaging a main receiver switch 34. Also, a power pilot light 24 is mounted on the top of the hull 10 on the starboard side thereof for being electrically coupled through circuit conductors 25 to the main propulsion switch 22, thereby visually indicating when electrical power is applied to the electrical motor proportional speed control 50 (or first control means).

A second channel of the radio receiver 30 is designated for receiving a direction control signal. The radio control signals are demodulated by the radio receiver 30 and utilized to control the position of an electromagnetic actuator 32 responsive to this direction control or second signal. The mechanical actuator 32 is coupled through a mechanical linkage system 62 for controlling the position of a rudder 60 coupled to the outerside of the hull 10. In this manner the second signal will control the angular position of the rudder 60 for controlling the direction of travel of the hull 10 across the body of water.

A third one of the radio control signals is designated for actuating one or more locator signals for assisting the distant operator in locating the position of the vessel when in darkness or when the vessel is obscured by vegetation. This location signal (or third signal) is demodulated from the radio control signals by the radio receiver 30 and transmitted over a circuit line 72 to actuate an audible alarm 70. Typically the audio alarm 70 comprises a loud buzzer-type signal, but other audible signals may also be controlled in a similar manner.

Another electrical circuit line 74 couples the third output of the radio receiver 30 with a visual locator beacon, shown generally as 76 in FIG. 1. An upper section 77 of the locator beacon generates a bright light, either of the constant illumination or the strobed type, upon receiving the appropriate signal from the radio receiver 30. Also, as an aid to navigation several running lights 78 also may be coupled to the visual locator beacon 76. The running lights 78 are of the typical red and green variety for designating the port and starboard sides of the vessel. In this manner the operator from some distance may easily determine the direction of travel of the vessel, even when the speed of the vessel is greatly reduced for trolling. Typically the side running lights 78 are operated continuously at night and are not operated responsive to radio control signals. The actual height of the visual beacon 76 may be determined such that sufficient clearance above the hull 10 is provided in order for the distant operator to continuously monitor the visual beacon 76, while at the same time the height of the visual beacon 76 will not interrupt or interfere with the operation of the fishing line to be subsequently described. A forward directed light may also be provided to illuminate the direction of travel of the boat.

With continuing reference to FIGS. 1 and 2, and with new reference to FIG. 3, the radio receiving antenna 40 is formed from a generally flexible material which allows the antenna to bend as required. The base of the antenna 40 is attached to the top of the hull 10 generally adjacent the stern section thereof. The base of the antenna 40 is mounted generally along the center line of the hull 10 in order to minimize any rotational moments therearound.

With specific reference to FIG. 3, line release means 40 are coupled to the distended end of the antenna 40. In a first preferred embodiment of the line release means, a rotatable line clip 82 is movably coupled to the antenna 40 to provide rotation around a central axis of the antenna 40. The rotatable line clip 82 includes a base section 84 which is movably coupled to the distended end of the antenna 40. The rotatable line clip 82 also includes a pair of juxtaposed moveable jaws 85 and 86 are biased so that when no element is positioned between the jaws, they will communicate with each other. Typically the jaws are tapered from the front or open ends thereof toward the central pivot pin 87 for producing a greater friction or holding force upon a section of fishing line engaged between the jaws 85 and 86 adjacent the pivot pin 87, as compared to the same holding force induced upon the fishing line adjacent the distended ends or open ends of the jaws. In this manner the angler may determine the relative degree of tension upon the fishing line which will be required to disengage the fishing line from between the biased jaws 85 and 86. In the first preferred embodiment of the rotatable line clip 82, the jaws 85 and 86 are wrapped with an insulative material such as polyvinylchloride or rubber to increase the friction of the jaws as they communicate with the fishing line held therebetween.

As illustrated in FIG. 1, a section of fishing line intermediate a first or baited end 101 and a second end 102, which is retained by the angler within a rod and reel, is restrained between the juxtaposed jaws 85 and 86 of the rotatable line clip 82. In this manner the angler may be separated by hundreds of feet from the fishing vessel while still controlling the trolling action of the baited hook through the water. Under this mode of operation the angler merely attaches the intermediate section 100 of the fishing line to the rotatable line clip 82 and then guides the fishing vessel to the area in which the fish are sought. The angler may then troll the fishing vessel in areas of very shallow water or in areas clogged with aquatic vegetation without unreasonable concern that the fishing vessel will become grounded or clogged with the vegetation. When the fish strikes the baited hook at the first end 101 of the fishing line, the tension on the intermediate section of the fishing line 100 will disengage the line from the rotatable line clip 82, thereby allowing the angler at the second end of the fishing line to directly control and land the fish. The flexible nature of the antenna 40 will absorb some of the shock when the baited hook at the first end 101 of the fishing line is struck by the fish or perhaps is temporarily fouled as the baited hook runs among vegetation etc.

In a second preferred embodiment of the rotatable line clip, the intermediate section 100 of the fishing line acts as an insulator between the electrically conductive jaws 85 and 86. These juxtaposed jaws 85 and 86 act as poles of a switch which are opened by the insulative section of the fishing line, but are closed as the fishing line is withdrawn therefrom. These poles of the switch are electrically coupled to either or both of the location means, namely the audible alarm 70 or the visual beacon 76, for applying power thereto when the line is removed, thereby signifying to the angler that a fish has taken the bait. This type of signaling is often useful when the angler's attention has been distracted or when the angler is fishing at night and is not able to visually monitor the relative motion of the antenna 40 and the intermediate section 100 of the fishing line.

With reference to the first preferred embodiment of the line release means 80 as illustrated in FIG. 3, a second device for engaging the intermediate section 100 of the fishing line is illustrated generally as 90. This assembly 90 is formed of a strong resilient material, such as copper or steel, which is coiled so as to provide spaces between adjacent circumferential sections thereof. Typically, this coil 90 may be operatively coupled to the radio receiving antenna 40 for acting as a loading coil for electrically shortening the required length of the antenna. However, the primary purpose of the coil 90 is to receive between adjacent circumferential sections thereof the intermediate section 100 of the fishing line. In this manner when the intermediate section 100 of the fishing line is looped through and between adjacent sections of the coil 90, both the antenna 40 and the coil 90 may be deformed through the tension produced as the fish strikes the baited end 101 of the fishing line. As the coil 90 is deformed, it bends toward the stern of the vessel and becomes generally horizontal, and may even progress further in this rotation until it points downwardly toward the body of water. This change in orientation will allow the intermediate section 100 of the fishing line to escape from between the coiled sections, thereby allowing the distant angler to directly control and work the fish without interference from the intermediate section 100 of the fishing line being coupled to the line release means 80. The operation of the first preferred embodiment in accordance with the present Invention will now be described with reference to FIGS. 1, 2 and 3. First, the main receiver switch 34 and the main propulsion switch 22 are actuated to supply electrical energy to the components of the system. The fisherman then places the fishing vessel into the water and attaches the intermediate section 100 of the fishing line to either the rotatable line clip 82 or to the coil 90. The fisherman then actuates the transmitter portion of the system so as to transmit radio control signals directing the fishing vessel to maneuver, noiselessly and with no wake, to areas in which the angler expects the fish to be feeding. This location may be as much as 1,000 feet from the shore or from the boat carrying the angler. Due to the shallow draft and high maneuverability of the fishing vessel the bait may be trolled through very shallow water or through areas which are not accessible to a larger boat or to a land-bound angler. As soon as the fish strikes the baited hook adjacent the first end 101 of the fishing line, the intermediate section 100 of the fishing line is disengaged from the line release means 80 (or the coil 90) and the angler then proceeds to haul-in the fish in the conventional manner. Due to the energy efficient design of the propulsion system, the radio receivers and other electrically operated equipment on the fishing vessel, the vessel may be used in excess of two hours under normal operation without recharging or replacing batteries.

In the alternate preferred embodiments of the present invention, the angler in addition to being able to control the speed and direction of travel of the fishing vessel by radio control signals may also actuate the visual beacon 76 or the audio alarms 70 when the angler becomes visually separated from the fishing vessel. In another alternate embodiment of the present invention either or both of the visual beacon 76 and the audible alarm 70 may be actuated by the electrical contact between the conductive jaws 85 and 86 of the rotatable line clip 82 responsive to the intermediate section 100 of the insulative fishing line being removed therefrom due to tension created by the fish striking the baited end 101 of the fishing line.

Thus, preferred embodiments of the radio controlled fishing apparatus in accordance with the present invention have been described as examples of the invention as claimed. However, the present invention should not be limited in its application to the details and construction illustrated in the accompanying drawings or the specification, since this invention may be practiced or constructed in a variety of other different embodiments. Also, it must be understood that the terminology and descriptions employed herein are used solely for the purpose of describing the preferred embodiments and the suggested operation thereof, and therefore should not be construed as limitations on the operability of the invention.

We claim:

1. A combination fishing apparatus and toy vessel for controllably towing a section of fishing line intermediate a baited end and the angler, said fishing apparatus comprising in combination:

a floating body;

radio receiver means having an antenna coupled thereto for receiving radio control signals from a distant command transmitter, with said radio receiver means having first demodulator means for reconstructing a first signal from said radio control signals;

power means operably coupled to said radio receiver means for propelling said floating body over the surface of a body of water responsive to said first signal; and line release means coupled to said antenna adjacent a distended end thereof for receiving therethrough and controllably releasing the intermediate section of the fishing line responsive to the tension on the fishing line exceeding a predetermined limit.

2. The remote control fishing vessel as described in claim 1 wherein said power means comprises in combination:

a source of electrical power;

a propeller operably coupled to an electrical motor for being rotated thereby so as to propel said floating body over the surface of the body of water; and first control means operably coupled between said source of electrical power and said electrical motor for controlling the flow of electrical energy therebetween responsive to said first signal, whereby the speed of the floating body may be remotely controlled.

3. The remote control fishing vessel as described in claim 2 wherein said radio receiver means includes second demodulator means for reconstructing a second signal from said radio control signal; and further including rudder means attached to said floating body and coupled to said radio receiver means, said rudder means for controlling the direction of travel of said floating body over the surface of the body of water responsive to said second signal.

4. The remote control fishing vessel as described in claim 3 wherein said line release means comprises a pair of moveably juxtaposed jaws biased to receive and hold therebetween the section of fishing line, with said jaws moveably coupled to said antenna for swiveling around a rotational axis generally defined by a longitudinal axis of said antenna.

5. The remote controlled fishing vessel as described in claim 4 wherein said jaws are operatively tapered for producing a relatively small compression force adjacent opened ends thereof and for producing a relatively larger compression force therebetween adjacent the opposite ends thereof, whereby the tension force required to extract the fishing line from between said jaws may be determined by adjustably locating the fishing line intermediate said open ends and said opposite ends of said jaws.

6. The remote controlled fishing vessel as described in claim 4 wherein said line release means further comprises a generally coiled spring coupled to said distended end of said antenna, with said coiled spring for receiving and retaining the fishing line between adjacent coils thereof, whereby sufficient tension on the fishing line will cause one of said coiled spring and said antenna to deform for allowing the fishing line to decouple from between said adjacent coils.

7. The remote controlled fishing vessel as described in claim 4 wherein said radio receiver means includes third demodulator means for reconstructing a third signal from said radio control signal; and further including location means for emitting location signals responsive to receiving said third signal, whereby a remote transmitter may be used to initiate said location signals for assisting in the location of the vessel.

8. The remote controlled fishing vessel as described in claim 7 wherein said location means comprises an audible signal generator for generating, responsive to said third signal, signals audible to the human ear.

9. The remote controlled fishing vessel as described in claim 7 wherein said location means further comprises a visual signal generator for generating, responsive to said third signal, signals visible to the human eye.

10. The remote controlled fishing vessel as described in claim 7 wherein said jaws of said release means comprise the two poles of an electrical switch which are operably coupled to said location means, with said jaws being biased into communication for generating said third signal responsive to the intermediate section of fishing line being withdrawn from between said jaws, whereby said location signals will be generated as the fish takes the baited end of the line and moves away from the vessel.

* * * * *